United States Patent

[11] 3,570,719

[72] Inventor Louis Schiff
 135 St. Pauls Road North, Hempstead, N.Y. 11500
[21] Appl. No. 752,727
[22] Filed July 2, 1968
[45] Patented Mar. 16, 1971

[54] REAGENT MIXING AND DISPENSING APPARATUS
 7 Claims, 3 Drawing Figs.
[52] U.S. Cl. .................................................. 222/137, 222/145
[51] Int. Cl. .................................................. B67d 5/52
[50] Field of Search ...................................... 222/134, 137, 145, 135, 136, 390

[56] References Cited
 UNITED STATES PATENTS
 3,117,696  1/1964  Herman et al. ............... 222/137
 3,390,814  7/1968  Creighton, Jr. et al. ...... 222/137

Primary Examiner—Samuel F. Coleman
Attorney—Theodore C. Jay, Jr.

ABSTRACT: Apparatus, which can be adapted for manual operation, for accurately and thoroughly mixing together a plurality of individually stable reagents, such as the constituents of a quick setting epoxy resin, to enable the reagents to react and form a product, such as the resin, which must be dispensed rapidly before hardening, and thereafter to accurately dispense a desired quantity of the product.

PATENTED MAR 16 1971

3,570,719

INVENTOR
LOUIS SCHIFF
BY Theodore Jay Jr.
ATTORNEY

REAGENT MIXING AND DISPENSING APPARATUS

BACKGROUND OF THE INVENTION

Epoxy resins and other bonding materials, adhesives, glues and the like are composed of two or more constituents or reagents which must be thoroughly mixed together and, upon being mixed, react to form the desired material or product. Typically, the reagents are individually stable and can be stored for indefinitely long periods before use. However, upon mixing, these reagents react to form the product, and the products must be used before the reaction is completed. For example, in epoxy resins, there are two reagents, known as a main resin and a curing agent respectively, which are normally in a viscous or paste state. Upon mixing, a liquid material is formed which will harden to an inert plastic. The material is used as a bonding agent and must be dispensed for use before the hardening action ensues; if not so dispensed, the material must be thrown away.

Epoxy resins find a wide range of applications ranging from industrial and marine uses to use in the home. Typically, small batches of resin are required. To this end, the conventional method of mixing is first to measure each reagent separately and, thereafter, to blend and mix same together with a suitable stirrer such as a pestal in a suitable container such as a mortar. This method has several serious disadvantages. For example, the entire amounts of both reagents can not be immediately mixed together. Small quantities of both reagents must be blended and mixed continuously in proper ratio. The ration cannot be accurately controlled but is estimated by eye. If the ratio is improper, the resin may fail in use. If the mixture is seen to exhibit poor characteristics before use, it must be thrown away and a new batch must be mixed. The net result is wasted material. In addition, the container must be quickly and thoroughly cleaned after use, otherwise the resin will adhere, and the container must be quickly and thoroughly cleaned after use, otherwise the resin will adhere, and the container must be thrown out. My invention overcomes all these difficulties.

SUMMARY OF THE INVENTION

In my invention, first and second reagents can be stored in first and second hollow cylinders. Each cylinder has an opening in one end and a discharge port in the other. First and second pistons each extend through the opening of the corresponding cylinder and are each axially movable back and forth in such cylinder.

Manually operable means coupled to the pistons can enable both pistons, operating in synchronism, to advance into the cylinders and force the reagents out of the discharge ports. The ratio of the cross-sectional areas of the cylinders can be selected as desired to insure that the reagents are discharged in proper ratio.

A mixing and dispensing chamber, which can be disposable or reusable, is connected to both ports and has a single discharge or dispensing conduit. The reagents are thoroughly mixed in proper ratio in the chamber and can be dispensed as desired. The chamber is sufficiently small to enable the user to mix only the quantity desired without waste. A mixing member, coupled to the means and rotated thereby, can be disposed in the chamber to carry out the mixing action as well as to control dispensing.

DETAILED DESCRIPTION OF PREFERRED EMBODIMENTS

Figure 1:
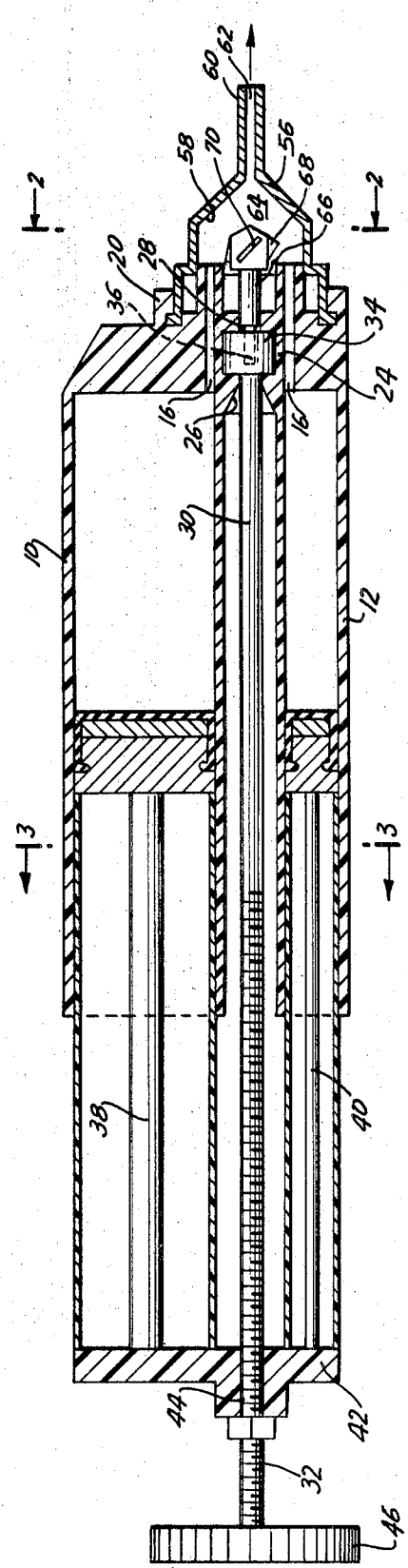
FIG. 1 is a perspective view of my invention.
Figure 2:
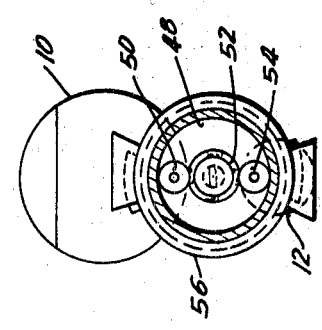
FIG. 2 is a cross-sectional view through 2—2 in FIG. 1.
Figure 3:
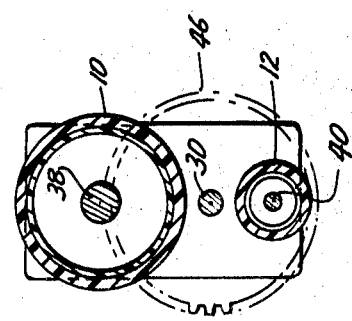
FIG. 3 is a cross-sectional view through 3—3 in FIG. 2.

Referring now to the drawings, I provide first and second parallel hollow cylinders 10 and 12, of like length but differing in diameter. Each cylinder has one open end and a discharge port 16 at the other end. These other ends are held together in a common flange 20 having conduits forming extensions of ports 16 and a central slot having an enlarged center portion 24 and aligned narrower passages 26 and 28 extending out of opposite ends.

A rotatable shaft 30 having a left-handed thread 31 passes through passage 26 and has an enlarged head 34 freely rotatable in portion 24. Head 34 has a slot 36 aligned with passage 28.

First and second pistons 38 and 40 are parallel to each other and are of like length. Each piston fits slidably within the open end of the corresponding cylinder. The diameters of the pistons are adjusted to fit relatively tightly within the corresponding cylinder but enable each piston to be movable back and forth easily along the axis of the cylinder.

The free ends of both cylinders terminate in a common flange 42 having a central threaded bore 44 through which shaft 30 passes, thread 32 engaging bore 44. The free end of shaft 30 carries a control knob 46 which can be manually rotated to move the pistons back and forth in synchronism in the cylinders.

A detachable sealing gasket 48 can over lie the exposed surface of flange 20 and can have holes 50, 52 and 54 respectively aligned with the discharge conduits and passage 28. The gasket is a flexible flat circular disc bearing against the surface of the flange 20 and disposed in section 58.

A hollow chamber 56 has an enlarged center hollow section 58 adapted to detachably engage the flange 20 with the gasket 48 in place. Element 56 terminates in an elongated extension 60 having a dispensing or discharge bore 62 extending in front of the cylinders and aligned with the axis of the shaft.

A mixing member 64 has a flattened shaft 66 which detachably engages slot 36 in frictiontight manner and has an enlarged head 68 disposed in section 58. When shaft 30 is rotated, member 64 is also rotated.

Thus when reagents are disposed in the cylinders, as for example, the main resin in cylinder 10 and the curing agent in cylinder 12, rotation of shaft 30 to move the plungers into their cylinders causes accurately metered amounts of the reagents to flow through the discharge conduits into the section 58. The reagents are mixed together in proper ratio by the rotation of the head 68 to react and produce the reacting product. The product is forced out of bore 62 for use. The rotation of the shaft is controlled by the operator to insure that the proper quantity of product is produced and dispensed as required.

Head 68 can have vanes 70 defining spiral grooves therebetween. The vaned head resembles a vane axial fan. However, the vanes are so contoured and directed as to produce a direction of flow opposite to that produced by the rotation of the shaft. The propulsive force produced on the reagents by the shaft exceeds that produced by the vanes, and the result is a turbulence which greatly improves mixing of the reagents, as well as producing a homogeneous mixing action.

The gasket 48, element 56 and member 64 can all be made of inexpensive materials which can be thrown away after one use to avoid the necessity of cleaning prior to reuse. If desired, however, these parts can be cleaned and reused.

The reagents in the cylinders have not, of course, been mixed and can be stored in the cylinders for an indefinite period prior to continued use.

Each cylinder-plunger assembly can be produced as a single replacable unit with the reagent stored therein. Moreover, these assemblies can be separable, permitting the reagents to be inserted into each cylinder or permitting disposable reagent containing cartridges to be stored therein.

While I have described my invention with particular reference to the drawings, my protection is to be limited only by the terms of the claims which follow.

I claim:

1. Apparatus for mixing first and second materials together to form a composite such as a quick setting resin for use in bonding and the like, said apparatus comprising:

first and second parallel hollow cylinders open at one set of corresponding ends, the opposite corresponding ends each having a discharge port, said first and second cylinders being adapted to have said first and second materials respectively disposed therein;

a mixing and discharge chamber detachably secured to said opposite corresponding ends to receive materials flowing out of said ports, to mix same together and to discharge the mixture for use, said chamber having an elongated extension parallel to the cylinders and provided with a hollow bore through which said mixture is discharged, said extension being disposed between the cylinders and extending forwardly thereof;

first and second parallel plungers, each plunger extending through the open end of the corresponding cylinder in the axial direction and being movable back and forth in said direction;

means coupled to both plungers to move same back and forth in synchronism whereby forward movement of said plungers into said cylinders forces said materials to flow out of said ports into said chamber for mixture and discharge; and a mixer member disposed in said chamber between said ports and said extension for mixing said materials, said member being rotatable about an axis parallel to said cylinders and being restrained from movement in the axial direction, said member being coupled to said means and rotated thereby when said plungers are moved.

2. Apparatus as set forth in claim 1 wherein said means includes an elongated shaft parallel to said cylinders, said shaft being rotatable about its own axis, and a mechanism connecting said shaft to said plungers to convert rotation of the shaft to axial motion of said plungers in said cylinders.

3. Apparatus as set forth in claim 2 further including coupling means interconnecting said shaft and said member whereby rotation of said member is produced by rotation of the shaft.

4. Apparatus as set forth in claim 3 wherein said member has an axis of rotation coincident with the bore in said extension and is provided with an outer spiral groove along which said materials flow.

5. Apparatus as set forth in claim 4 wherein the pitch of said groove is adjusted to tend to hold back the forward flow of said materials while the forward flow continues whereby a turbulent mixing action ensues.

6. Apparatus as set forth in claim 5 wherein said member is detachable and disposable.

7. Apparatus as set forth in claim 6 wherein said materials have a fixed ratio by volume, said cylinders having circular cross sections, the ratio of the squares of the radii of these cylinders being equal to said fixed ratio.